Dec. 1, 1931.  L. H. HILL  1,834,400
MANOMETER
Filed Oct. 14, 1924  3 Sheets-Sheet 3

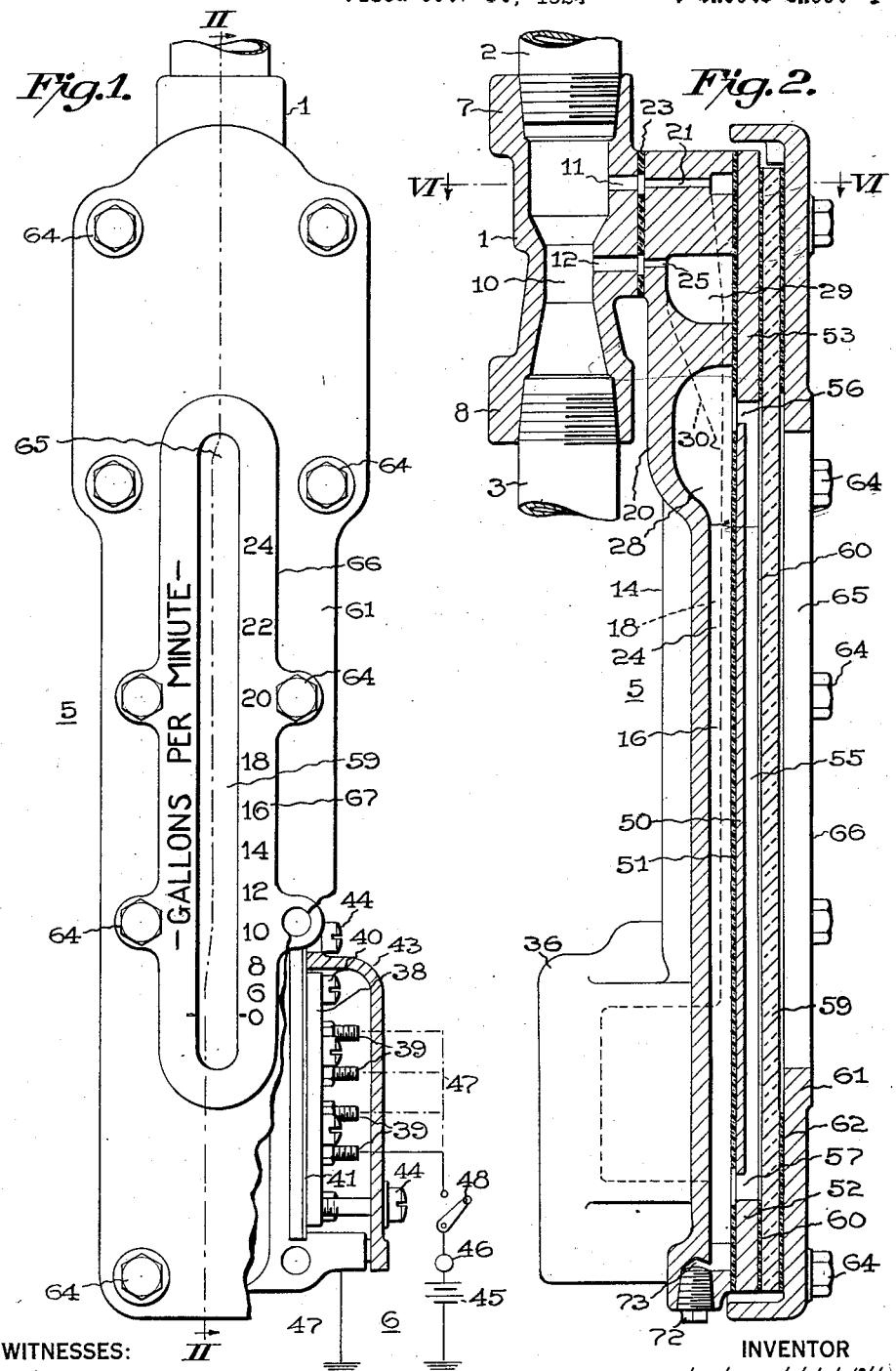

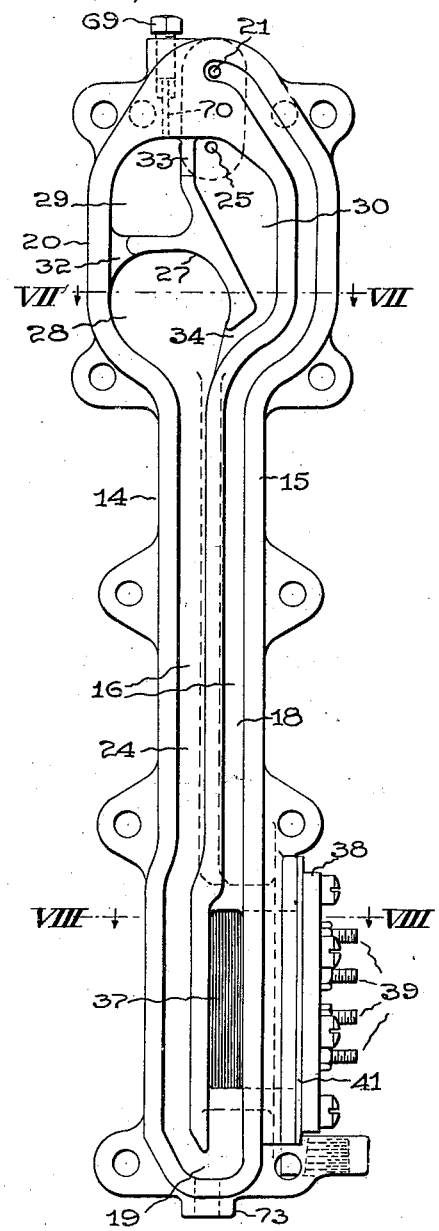
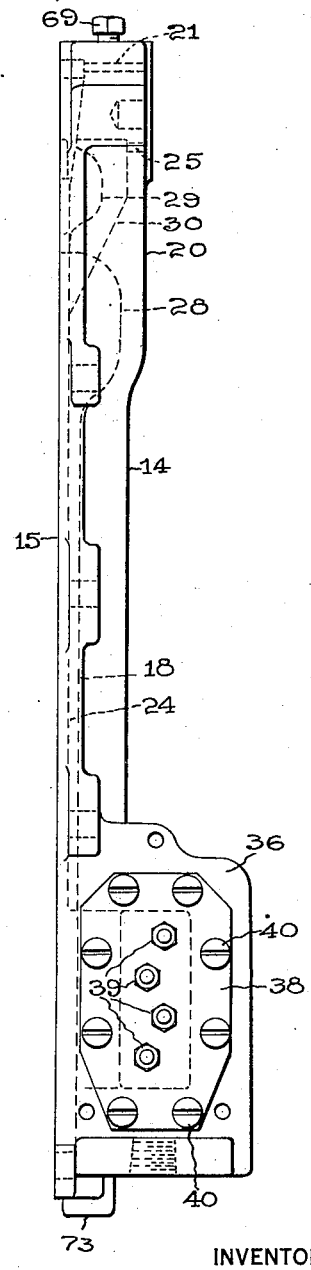

WITNESSES:
R. S. Harrison
F. H. Miller

INVENTOR
Leland H. Hill
BY
Wesley G. Carr
ATTORNEY

Patented Dec. 1, 1931

1,834,400

UNITED STATES PATENT OFFICE

LELAND E. HILL, OF SWISSVALE, PENNSYLVANIA, ASSIGNOR TO WESTINGHOUSE ELECTRIC & MANUFACTURING COMPANY, A CORPORATION OF PENNSYLVANIA

MANOMETER

Application filed October 14, 1924. Serial No. 743,575.

My invention relates to manometers and particularly to manometers for connection to Venturi tubes and other sources of fluid-pressure differences.

One object of my invention is to provide a manometer, of the above-indicated character, that shall be prevented from discharging its indicating or measuring liquid.

Another object of my invention is to provide a fluid separator, for a manometer, in which the formation of air and vacuum traps or pockets is prevented and the indicating liquid thereby permitted to always seek its proper level.

Another object of my invention is to provide a manometer that shall include a simple and effective alarm device.

A further object of my invention is to provide a manometer that shall be simple and durable in construction, economical to manufacture and effective in its operation.

Heretofore, in the use of manometers, containing mercury or other measuring liquid, as means for indicating fluid pressure and the rate of fluid flow, it has been difficult, under certain operating conditions, to retain the liquid in the manometer. That is, when the device is subjected to a presure above a certain critical value, the measuring liquid will be ejected from the manometer.

If the manometer is never subjected to a pressure beyond such critical value, the loss of liquid does not occur but, in certain commercial applications, it is not economically practicable to utilize a manometer of the size required to withstand pressure surges of unusual or infrequent values.

Consider, for instance, an electrical transformer cooling system, for cooperation with which the indicator of my invention is particularly adapted. Such a system comprises a coil or coils of metal tubing disposed in the tank of a transformer and adapted to conduct water therethrough.

Rather than to provide a manometer instrument of such size and cost as to prevent the expulsion of liquid by any of the extraordinary pressures which may develop, it is preferable to provide a compact and economical device which will operate over a practical range of working pressures and be protected against loss of its measuring liquid.

Accordingly, in practicing my invention, I provide a manometer that is constructed to operate only over a certain definite range of pressure values and that is provided with means, operable under unusual pressure conditions, to permit the free passage therethrough of a fluid of which an indication is desired and to prevent the ejectment of the measuring liquid. By my invention, air and vacuum traps, which would cause the measuring liquid or mercury to assume different levels for the same pressures, are prevented from forming and the device is thereby rendered accurate under all conditions of operation.

Figure 1 of the accompanying drawings is a front elevational view of a manometer constructed in accordance with my invention, with parts broken away for clearness;

Fig. 2 is a view taken along the line II—II of Fig. 1;

Fig. 3 is a front elevational view, similar to Fig. 1, of a main body or base member of the device;

Fig. 4 is a view taken at right angles to Fig. 3;

Figure 5:
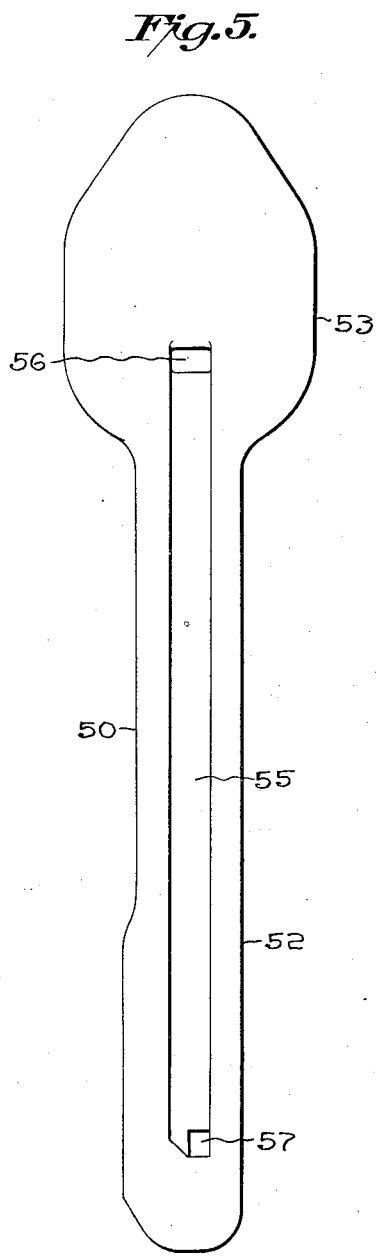
Fig. 5 is a detail front elevational view of an intermediate plate embodied in the structure of the other figures.
Figure 6:
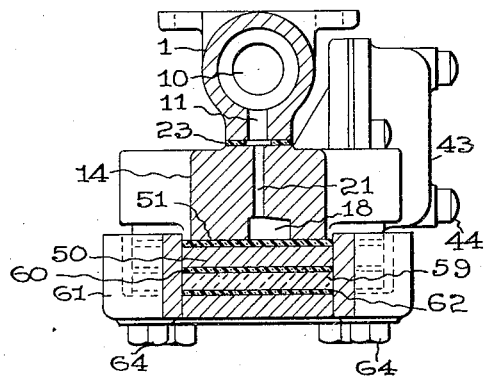
Fig. 6 is a view taken along the line VI—VI of Fig. 2.
Figure 7:
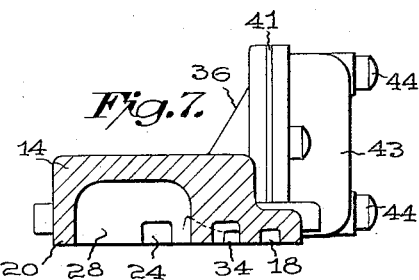
Figs. 7 and 8 are views taken along the lines VII—VII and VIII—VIII, respectively, of Fig. 3.
Figure 8:
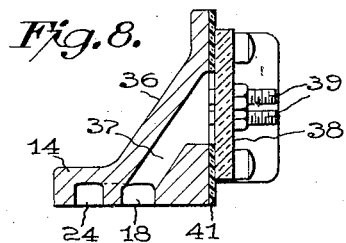

The device comprises, in general, a Venturi tube 1 for connection to the ends 2 and 3 of a cooling-tube system (not shown), a manometer structure 5 and an alarm circuit 6.

The Venturi tube is of a usual construction comprising entrance and exit portions 7 and 8 for the reception of the tube ends 2 and 3, respectively, a constricted intermediate throat portion 10 and openings 11 and 12 disposed, respectively, above and adjacent to the throat portion 10. In accordance with the well-known operation of such tubes, a flow of fluid from the tube 2 to the tube 3, through the throat portion 10, causes a difference of pressure between the openings 11 and 12, of which the former constitutes a high-pressure opening and the latter a low-pressure opening. The difference of pressure between the openings is proportional to the rate of flow of the fluid.

The manometer structure 5 comprises a base member 14 having a plane front surface 15 in which a relatively shallow groove 16 of substantially U-shape is formed. The groove 16 has a high-pressure leg 18 extending upwardly, from the bend 19 in the groove and around an enlarged chamber portion 20, to an opening 21 that communicates with the high-pressure opening 11 in the Venturi tube 1, through an opening in a sealing gasket 23 between the base member 5 and the Venturi tube.

The low-pressure leg 24 of the groove 16 extends upwardly from the bend 19 and similarly communicates with the low-pressure opening 12 in the Venturi tube, through the chamber 20, an opening 25 in the base member 5 and another opening in the gasket 23.

The chamber portion 20 comprises partitions 27 to subdivide the chamber into compartments 28, 29 and 30 which intercommunicate through openings 32, 33 and 34. All of the inner surfaces of the chamber portion 20 and the surfaces of the partitions 27 are constructed, as by rounding, to prevent the formation of air and vacuum pockets in a manner to be hereinafter explained.

At the lower end of the base member 14, an enlarged offset chamber portion 36, communicating with the high-pressure groove 18 through an opening 37, is provided with an insulating plate or closure member 38 through which a plurality of terminal members 39 extend at different levels. This plate is secured to the base member 14 by screws 40 which are also adapted to adjust the thickness of a compressible gasket or gaskets 41 to vary the volume of the chamber 36. By varying the thickness of the gasket 41, the level of a measuring liquid, such as mercury (not shown), may be adjusted to calibrate the device in accordance with the conditions under which it is to operate. A lid or cover member 43 that is suitably secured in position, as by screws 44, may be provided to protect the terminals 39.

The alarm circuit 6 comprises a source 45 of electromotive force that is connected from one of its terminals to one of the terminals 39, through a lamp 46 or other suitable alarm device, and from its other terminal to ground, as indicated by full lines. The base member 14 is also grounded, as by conductor 47, to complete a circuit from the source 45 of electromotive force, through the lamp 46, the terminal 39 and the liquid in the chamber 36, to the other terminal of the source 45. The alarm device 46 may selectively be connected to other of the terminals 39, as by conductors 47, indicated by dotted lines. A switch 48 may be provided to open the circuit 6.

The plate 50, shown in detail in Fig. 5, is sealed in position over the grooved surface 15 of the base member 14 by a gasket 51 and comprises an elongated portion 52 covering the groove 16 and an enlarged upper portion 53 covering the chamber 20.

The plate 50 is provided on its outer surface with a groove 55 having an upper opening 56 communicating with the compartment 28 of the chamber 20 and a lower opening 57 communicating with the high-pressure groove 18 in the base member 14 above the bend 19 between the high and low pressure grooves 18 and 24 of the groove 16.

A plate 59 of light-transmitting material, such as glass, is sealed in position over the plate 50, as by a gasket 60, and is protected by a face-plate or cover member 61 and a gasket 62 between the glass plate 59 and the cover member 61. Screws 64 project through the cover member 61 into the base member 14 to clamp all of the parts together in properly sealed relation. An elongated slot 65 in the cover member 61 permits a view, through the plate 59, of the measuring liquid in the groove 55. A raised portion or flange 66 on the cover member 61 may be provided for the reception of a graduated scale 67 to indicate the flow of the fluid in the tubes 2 and 3 in terms of gallons per minute or other suitable units.

In the above structure, the grooves 16 and 55 are so closed, on the sides thereof by the plates 50 and 59, respectively, as to constitute tubes, similar to a manometer constituted entirely of integral tubular glass portions. This manometer differs from an ordinary manometer, however, in that the groove 55 constitutes an additional low pressure leg in parallel with the low-pressure leg or groove 24.

A screw plug 69 closes an upper opening 70 that is provided for the reception of mercury or other suitable measuring liquid of greater specific gravity than the fluid being measured which is, in this case, water. Sufficient mercury is initially admitted to fill the grooves 18, 24, and 55 up to the level marked zero on the scale 67. In this condition, the inner ends of the terminals 39 are immersed in the mercury to thereby complete the circuit 6, when the switch 48 is closed.

In operation, when water flows through the throat 10 in the Venturi tube 1 from the tube 2 to the tube 3, a pressure difference exists between the openings 11 and 12, being higher at the opening 11. Water in the high-pressure leg 18 then transmits this pressure to the mercury which is thereby depressed in the leg 18 and raised in the parallel low-pressure legs 24 and 55, in the leg 55 of which it may be observed on the scale 67.

Since the water pressures employed are usually fairly constant, the alarm device 46 is connected to one of the terminal members 39 that is above the level of the mercury in the high-pressure leg 18. Thus, even though the switch 48 be closed, the circuit 6 will be open and the alarm device deenergized under ordinary flow conditions. When the pressure is removed or lowered to a dangerous value, the mercury will rise in the high-pressure leg 18 and, consequently, in the chamber 30, to close the circuit 6 and energize the alarm device.

When the pressure difference between the openings 11 and 12 in the Venturi tube 1 becomes excessive or, in other words, reaches a certain critical value sufficient to tend to eject the mercury from the manometer, the mercury will be depressed in the high-pressure leg 18 until it reaches the opening 57 in the plate 50. In this position of the mercury, the water thereabove in the high-pressure leg 18 will by-pass the mercury below the opening 57 in the bend 19, and the main body of mercury in the low-pressure leg 24, and flow upwardly through the groove 55 and the opening 56 into the compartment 28 of the chamber 20.

This action, which prevents the passage of water upwardly through the groove or leg 24, is caused by the relation of the opening 57, in the plate 50, to the opening or bend 19, between the grooves 18 and 24. The grooves 18, 24 and 55 constitute substantially a three-legged manometer, with one high-pressure leg 18 and two low-pressure legs 24 and 55. The leg 55 communicates, at its lower end, with the leg 18, at a position above the point where the leg 24 communicates with the leg 18. Consequently, when water tends to pass through the manometer, the mercury in the leg 18 cannot be depressed therein below the opening 57. The water passes through this opening and upwardly through the leg 55. The water being, thus, passed through the leg 55 does not pass the bend 19 nor through the leg 24.

However, the mercury in the leg 55 and particles of the mercury from the lower end of the leg 24 may be carried with the water through the leg 55. The mixed water and mercury particles enter the compartment 28, through the opening 56, in a direction toward the rounded rear surface of the compartment 28 (see Figs. 2 and 4) and at right angles to the opening 32 between the compartments 28 and 29. The larger mercury particles, as they enter the compartment 28, will impinge against the rounded rear wall of the compartment 28 and be deflected downwardly toward the main body of mercury in the low-pressure leg 24.

Since there is no flow of water upwardly in the leg 24, the water above the mercury therein and below the opening 56 will be substantially only under static pressure, thus unimpeding the return of the mercury particles ejected from the opening 56 and constituting a base over which the water from the opening 56 flows through the compartment 28 to the opening 32. Here again, smaller mercury particles which did not return to the leg 24, by striking the rear wall of the compartment 28, but were carried through the opening 32, strike the rounded surface of the compartment 29 to be deflected from the path of the water through the opening 33 and to be returned to the leg 24, through the compartment 28, when the excess pressure subsides.

Still smaller mercury particles, which survive this separating process in the compartment 29 and are carried through the opening 33, tend to carry in a straight line beyond the right-angularly related opening 25 and to strike the side surface of the compartment 30 whereby they are deflected downwardly, through the opening 34, into the leg 24.

The chamber portion 20 thus comprises a series of separating compartments through which the ready flow of the water is permitted, the passage of mercury particles is substantially entirely prevented and fluid pockets or eddy corners are eliminated.

A screw plug 72 is provided for an outlet portion 73 at the bend 19 by which the mercury may be removed from the manometer.

By means of my invention, a considerably smaller and more economical manometer is provided than an ordinary manometer of a size sufficient to prevent the ejectment of the measuring liquid, the levels of the liquid are unaffected by air and vacuum pockets and a generally more effective instrument of its class is obtained.

While I have shown and described a particular form of my invention, changes may be effected therein without departing from the spirit and scope thereof, as set forth in the appended claims.

I claim as my invention:

1. In combination, a manometer having high and low liquid-pressure inlet and outlet portions, respectively, said manometer containing a measuring liquid heavier than the fluid under pressure and comprising upright parallel low-pressure legs, the first of which has its lower entrance above the lower entrance of the second to permit the passage of the fluid into the first leg at a certain pressure, said legs being joined at their upper ends above the levels of the liquid therein providing for portions of the liquid carried through the first leg during said passage of the fluid to be returned to the second leg, and means communicating with said first leg and providing a plurality of chambers having communicating passages and curved inner surfaces for preventing the formation of air and vacuum pockets tending to prevent the return of the liquid therefrom to the second low-pressure leg to its normal levels under normal pressure conditions.

2. A manometer comprising a base member having a groove of substantially U-shape therein and an enlarged chamber portion at a low-pressure end of the groove, said chamber having partitions dividing the same into communicating compartments constructed free of fluid traps to direct a fluid under pressure through said chamber and to deflect a heavier measuring liquid back into the U-shaped portion of the groove, a plate disposed over the grooved-and-chambered portion of said base member and having a groove in one surface and openings extending therethrough adjacent to the ends of its groove, the upper opening in said plate communicating with the groove in said base member adjacent to said chamber portion and the lower opening in said plate communicating with the high-pressure leg of the U-shaped groove in said base member above the bend in the U-shaped groove, and a light-transmitting plate disposed over the groove in said first plate.

3. A manometer comprising a tubular portion of substantially U-shape and a portion providing an offset chamber communicating with one of the legs thereof, contacts associated with said chamber for controlling an electric circuit including an alarm device, an electrically conducting measuring fluid in said tubular portion for cooperation with said contacts and means for simultaneously calibrating the manometer and adjusting the fluid-level relative to said contacts comprising means for varying the volume of said chamber.

4. A manometer comprising a tubular portion of substantially U-shape and a portion providing an offset chamber communicating with one of the legs thereof, a closure member for said chamber, an electric circuit including an alarm device and a plurality of insulated terminal members extending through said closure member, the manometer being adapted for the reception of a conducting measuring liquid for cooperation with one of said terminal members to actuate the alarm device, and means including a yieldable member disposed between said chamber portion and said closure member for sealing said chamber and permitting adjustment of the volume thereof to calibrate the manometer and to adjust the operation of said circuit.

5. A manometer comprising a high-pressure leg, means including a plurality of low-pressure legs for preventing excessive pressure in one of said low-pressure legs, and means for receiving a measuring fluid from another of said low-pressure legs and directing it back to said one low-pressure leg, said receiving means providing a series of communicating chambers having inlet and outlet ports disposed in staggered relation to each other and rounded deflecting surfaces opposite the inlet ports.

6. A manometer structure comprising a plurality of members providing an upright chamber between adjacent surfaces thereof of substantially U-shape having high and low-pressure legs for the reception of an indicating liquid and a pressure-relief passage communicating between the low-pressure leg above the indicating liquid and the high-pressure leg adjacent to, but above, the lower-end bend in said U-shaped chamber whereby an actuating fluid of excess pressure forces the liquid in the high-pressure leg to a position where its upper surface is aside the lower end of the pressure-relief tube to permit the actuating fluid to by-pass the indicating liquid into the pressure-relief tube.

7. A manometer structure comprising a plurality of members providing an upright chamber between adjacent surfaces thereof of substantially U-shape having high and low-pressure legs for the reception of an indicating liquid and a pressure-relief passage communicating between the low-pressure leg above the indicating liquid and the high-pressure leg through a lateral opening in the side of the high-pressure leg adjacent to, but above, the lower-end bend portion of the U-shaped chamber.

In testimony whereof, I have hereunto subscribed my name this 9th day of October, 1924.

LELAND H. HILL.